(12) United States Patent
Roessner

(10) Patent No.: US 9,518,598 B2
(45) Date of Patent: Dec. 13, 2016

(54) EXPANSION ANCHOR

(71) Applicant: Hilti Aktiengesellschaft, Schaan (LI)

(72) Inventor: Marcel Roessner, Feldkirch (AT)

(73) Assignee: Hilti Aktiengesellschaft, Schaan (LI)

( * ) Notice: Subject to any disclaimer, the term of this patent is extended or adjusted under 35 U.S.C. 154(b) by 74 days.

(21) Appl. No.: 14/383,017

(22) PCT Filed: Mar. 5, 2013

(86) PCT No.: PCT/EP2013/054340
§ 371 (c)(1),
(2) Date: Sep. 4, 2014

(87) PCT Pub. No.: WO2013/135524
PCT Pub. Date: Sep. 19, 2013

(65) Prior Publication Data
US 2015/0030409 A1    Jan. 29, 2015

(30) Foreign Application Priority Data
Mar. 13, 2012    (DE) .......... 10 2012 203 865

(51) Int. Cl.
| F16B 13/06 | (2006.01) |
| F16B 29/00 | (2006.01) |
| F16B 19/10 | (2006.01) |
| F16B 13/08 | (2006.01) |

(52) U.S. Cl.
CPC .......... *F16B 29/00* (2013.01); *F16B 13/0833* (2013.01); *F16B 19/1081* (2013.01)

(58) Field of Classification Search
CPC .. F16B 19/1081; F16B 13/063; F16B 19/1027

USPC .......... 411/45–48, 55, 57.1, 60.1, 14
See application file for complete search history.

(56) References Cited

U.S. PATENT DOCUMENTS

| 3,854,374 A | * | 12/1974 | Boyle | F16B 19/1081 |
| | | | | 174/138 D |
| 4,085,651 A | * | 4/1978 | Koscik | F16B 19/1081 |
| | | | | 411/41 |
| 4,488,843 A | * | 12/1984 | Achille | F16B 19/1081 |
| | | | | 411/385 |

(Continued)

FOREIGN PATENT DOCUMENTS

| AU | 2011201773 A1 | 12/2011 |
| CN | 1721714 A | 1/2006 |

(Continued)

OTHER PUBLICATIONS

Chinese Office Action dated May 4, 2015 (Five (5) pages).

(Continued)

*Primary Examiner* — Flemming Saether
(74) *Attorney, Agent, or Firm* — Crowell & Moring LLP

(57) ABSTRACT

An expansion anchor is disclosed. The expansion anchor has an elongated main part having a receiving area extending substantially in the longitudinal direction, into which an expansion element can be inserted in the longitudinal direction, to press expansion tabs laterally from an initial position to an expanded position. At least one setting control member can be moved in the longitudinal direction on the expansion anchor and it is moved by movement the expansion element relative to the main part.

10 Claims, 2 Drawing Sheets

(56) References Cited

U.S. PATENT DOCUMENTS

| | | | | |
|---|---|---|---|---|
| 4,516,886 A | * | 5/1985 | Wright | E21D 21/008 405/259.3 |
| 4,899,431 A | * | 2/1990 | Borntrager | B25B 31/00 29/244 |
| 5,779,085 A | * | 7/1998 | Havlinek | F16L 55/11 215/361 |
| 6,062,784 A | | 5/2000 | Wisser et al. | |
| 6,450,745 B2 | | 9/2002 | Wieser | |
| 7,063,490 B2 | * | 6/2006 | Ricker | F16B 4/002 411/14 |
| 8,214,997 B2 | * | 7/2012 | Richie | F16B 13/065 29/522.1 |

FOREIGN PATENT DOCUMENTS

| | | |
|---|---|---|
| CN | 1301373 C | 2/2007 |
| DE | 35 26 094 A1 | 1/1987 |
| DE | 40 33 396 A1 | 5/1991 |
| DE | 100 12 644 A1 | 9/2001 |
| DE | 10 2005 014 753 A1 | 10/2005 |
| DE | 10 2007 028 844 A1 | 1/2009 |
| EP | 0 210 127 A1 | 1/1987 |
| EP | 2 400 167 A2 | 12/2011 |
| GB | 2 455 635 A | 6/2009 |
| JP | 2001-289214 A | 10/2001 |

OTHER PUBLICATIONS

International Search Report dated Jul. 2, 2013 (Two (2) pages).
German Search Report dated Feb. 1, 2013, with Statement of Relevancy (Six (6) pages).

* cited by examiner

EXPANSION ANCHOR

This application claims the priority of International Application No. PCT/EP2013/054340, filed Mar. 5, 2013, and German Patent Document No. 10 2012 203 865.5, filed Mar. 13, 2012, the disclosures of which are expressly incorporated by reference herein.

BACKGROUND AND SUMMARY OF THE INVENTION

The invention relates to an expansion anchor comprising an elongated main part, which has a substantially longitudinally extending receiving area into which an expansion element is inserted in the longitudinal direction in order to press the expansion tabs laterally from a starting position to an expanded position.

Expansion anchors are used to fix components to a main part. For this purpose, the main part element of the expansion anchor has expansion tabs, which after insertion of the expansion anchor into a hole can be spread laterally and thus clamp the expansion anchor into the hole. For this purpose, an expansion element is typically provided, which is stored in the expansion anchor so that it can move longitudinally, and when moved pushes the expansion tabs sideways into a spread position. A disadvantage of the previously known expansion anchors is that after insertion of the expansion anchor into the main part, it is not possible to control whether the expansion tabs are sufficiently expanded in order to achieve a sufficient clamping effect.

The objective of the invention is to create an expansion anchor of the aforementioned type, which offers better verification of expansion properties in the installed state.

To achieve the objective, in an expansion anchor having an elongated main part with a receiving area substantially extending in the longitudinal direction, into which an expansion element is longitudinally inserted to push the expansion tabs laterally from a starting position to an expanded position, at least one setting control element exists, which is provided in the longitudinal direction of the expansion anchor, and is shifted by movement of the expansion element relative to the main part with the latter. The position and location of the expansion tabs cannot be controlled if the expansion anchor is pushed in. The expansion element action of the expansion tabs can be determined in advance as a function of the position of the expansion element. However, the position of the expansion element when pushed in cannot be determined with sufficient precision. For this reason, a setting control element is provided, which is displaced during insertion of the expansion element with the latter, whereby the position change of the expansion element is determined from the outside. Because the setting control element does not need to transfer any forces, such as expansion forces, it can be made very easily and after engagement of the expansion anchor after the expansion action, can be at least partially removed, so that the expansion anchor closes flush with the surface of the component.

Preferably, the setting control element is made longitudinally. The setting control element can thus easily be stored longitudinally or in the receiving area, so that easy longitudinal movement is possible. To facilitate control of the insertion depth of the expansion element, the setting control element can, for example, in the home position of the expansion element, extend from the main part element and, in the spread position, not extend from the rear from the main part element. That means that easy control of the position of the expansion element is possible, since for a correctly used expansion element the setting control element no longer projects from the receiving area or is not even visible.

So as not to impair the movement of the expansion element in the main part, the main part has one substantially axially extending channel or one recess, in which at least one setting control element is guided to move. The channel or the recess is formed so that the setting control element is guided outside the movement path of the expansion element, whereby the expansion element and the setting control element cannot become jammed. Thus an impairment of the function of the expansion anchors can be excluded with certainty.

This channel or recess can adjoin the receiving area, i.e., form a groove emerging from the receiving area, thus permitting easier manufacturing of the recess or the channel.

The receiving area of the expansion anchor can have a thread, into which the expansion element with the matching thread can be screwed, whereby precisely controlled insertion of the expansion element and thus precise insertion of the expansion element to the desired insertion depth in the receiving area is enabled. The channel or the recess preferably adjoin the thread. That means that the channel or the recess and thus the therein extending setting control element do not project into the thread, so that the expansion element can be moved unhindered into the receiving area.

The channel or the recess extends at least from the thread base and divide the thread into sections, so that the setting control element is guided outside of the thread and does not project into it.

The channel can further be used for easier manufacturing of the thread. Normally, in order to cut, the cutting tool turns such a thread into the receiving area over several windings, whereby only one thread rotation can be cut per rotation. The thread cutter must then again be fully retracted from the receiving area, and the newly cut thread must be screwed out. Through the channel or the recess, a cutting tool with a plurality of longitudinally extending cutting edges situated one behind the other can be used, which can, with the cutting edges, be guided into the receiving area completely by the cutting edges without turning, axially via the channel(s) or recess(s). To cut the thread, this tap, after insertion into the receiving area, is turned along its longitudinal access, until the cutting edges again lie in the next recess or channel in the circumferential direction. With this, each of these cutting edges has cut a complete thread rotation of the thread, whereby all cut thread rotations together make up a complete thread. Because the cutting edges again lie in the recess or the channel, the tap is then simply removed from the receiving area in the axial direction. It is also possible to cut the total length of the thread with a maximum of one single rotation of the tap. After cutting of the thread, the recess or channel can be used to guide the setting control element.

It is also possible that a plurality of setting control elements are provided, which are, in particular, evenly arranged in the circumferential direction. These can, for example, be assigned to individual expansion tabs, so that more precise verification of the position of the expansion elements and thus the expansion tabs is possible.

If a plurality of setting control elements are used, they can be connected to each other such that they are jointly moved by the expansion element.

On the expansion element, a cam is provided, for example, which projects into the movement path of the expansion element and is connected or can be coupled thereto. This cam may be a ring, for example, into which a tip of the expansion element projects. The expansion element takes this ring moving in a longitudinal direction and thereby shifts the setting control elements.

The setting control element may for example be so coupled to the expansion element, so that the setting control element upon insertion of the expansion element is displaced with the latter, but is retained by a release of the expansion anchor by withdrawing the expansion element, in the recording. But it is also conceivable that the setting control element is fixedly coupled to the expansion element and upon retraction of the expansion element is again withdrawn from the receiving area together with it. This allows, on the release of the expansion anchor, a visual inspection of whether the expansion element was withdrawn to a sufficient width to reduce the expansion effect, so that the expansion anchor can be pulled out of the hole. In addition, the expansion anchor can be used multiple times.

The setting control element can for example also form a unit in advance and be firmly attached to the expansion element, so that they are not detachable from each other.

The fixation is for example formed by the cam being mounted on a shoulder or a groove on the expansion element.

The cam and at least one setting control element are, for example, one-piece, in particular made of sheet metal, thereby permitting easier manufacturing of this setting control element. The setting control elements can extend, for example, in a star shape by an annular cam, and will be bent at right angles before placement in the main part of the expansion anchor prior to insertion.

On the expansion anchor, an expansion element is preferably provided, which in particular has a tapered tip. During insertion of the expansion element into the main part, this tip forces the expansion tabs laterally into the expanded position. The expansion tabs, in order to reinforce this expansion effect, have a corresponding tapered shape so that a larger expansion effect can be achieved.

Other advantages and features can be found in the following description in conjunction with the accompanying drawings.

DETAILED DESCRIPTION OF THE DRAWINGS

Figure 1:
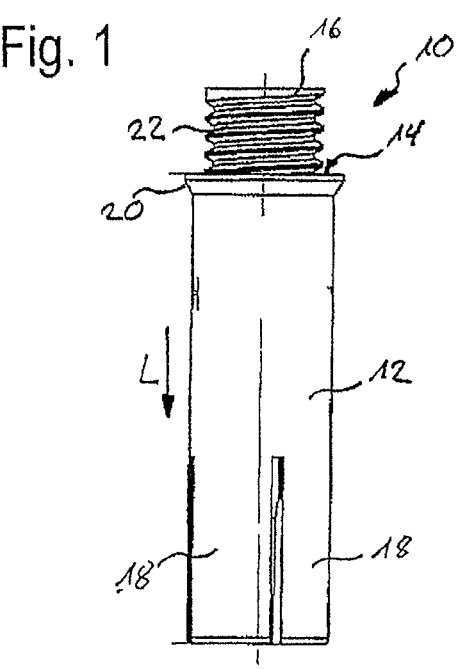
FIG. 1 is a side view of an expansion anchor according to the invention.

FIG. 1 shows an expansion anchor 10 for attachment to a main part. The expansion anchor 10 has an elongated main part 12 having a through seat 14 in the longitudinal direction L and an opening. In the longitudinal direction L, at the front end of the main part 12, a plurality of expansion tabs 18 are provided which can be resiliently spread apart radially to the outside. The rear end in the longitudinal direction L of the main part 12 has a tapered collar 20.

Figure 2:
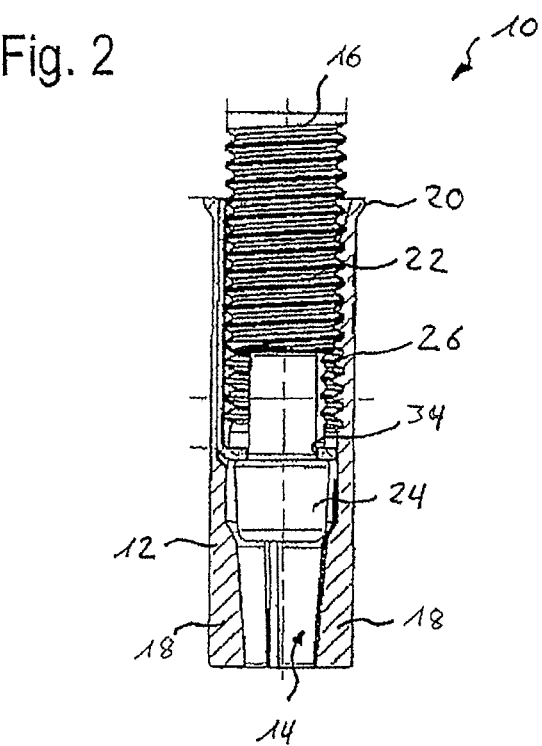
FIG. 2 is a longitudinal sectional view through the expansion anchor from FIG. 1.

In the receiving area 14, an expansion element 16 is screwed in the longitudinal direction, which, as can be seen in FIG. 2, has an external thread 22, and a tapered tip 24. Between the external thread 22 and the tip 24, a circumferential groove 34 in the circumferential direction (see FIG. 2) is provided.

The expansion anchor 10 has internal thread 26 corresponding to the external thread 22, into which the expansion element 16 may be screwed. In the area of the expansion tabs 18, the receiving area 14 is tapered in the longitudinal direction L.

For installation of the expansion anchor 10, the main part 12 is inserted into a bore of a subsurface until the collar 20 rests on the surface of the subsurface. The tapered collar 20 preferably adjoins flush with the surface or rests on it. Because of the collar 20 on the one hand there is a centering in the bore and on the other hand, by the clamping action of the tapered shoulder, pre-fixing in the hole is performed.

Then the expansion element 16 is screwed into the thread 26 of the main part 12, wherein a co-rotation of the main part 12 is prevented by the pre-fixing via the collar 20. On the collar 20, extending projections or ribs can be provided for a better fixation, for example, in the radial or longitudinal direction L.

By being screwed in, the expansion element 16 is moved in the longitudinal direction L, whereby the expansion tabs 18 are pushed from the initial position shown in FIGS. 1 and 2 radially outwards into an expanded position by the tapered tip 24. The expansion tabs 18 are pressed against the wall of the hole, whereby the expansion anchor 10 is jammed in the bore and cannot be retracted from it.

In the main part 12, a further plurality of recesses, or channels 28 are provided (see FIG. 3), extending in the longitudinal direction L over the entire length of the main part 12. The recesses extend from the bottom of the thread starting radially outward, adjoin the thread and are open to the receiving area 14. Through these recesses 28, the thread 26 is divided in the circumferential direction into a plurality of segments.

Figure 4:
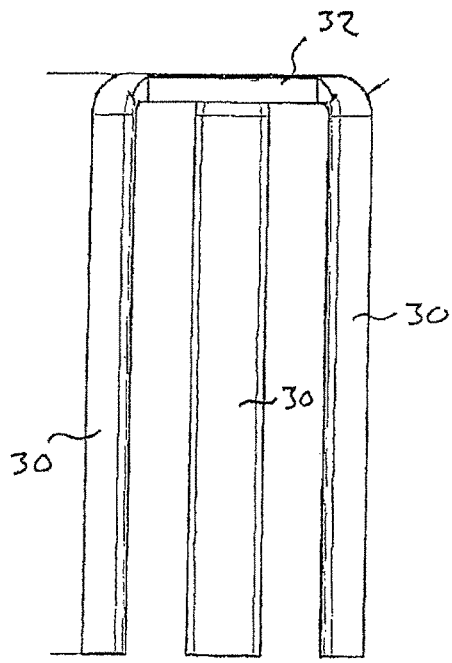
FIG. 4 shows a detailed view of the setting control element of the expansion anchor from FIG. 1.
Figure 5:
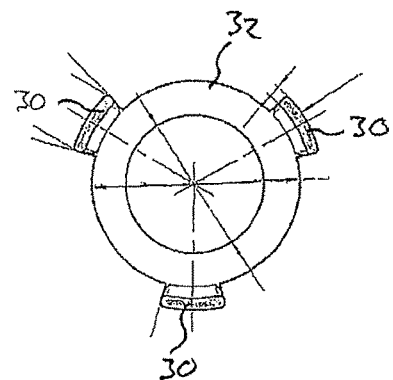
FIG. 5 is a plan view of the setting control element from FIG. 4, and FIG. 6 a detailed view of the expansion anchor from FIG. 1 in the region of the setting control elements.

In each recess 28, an elongated setting control element 30 (see FIG. 4) is arranged to be movable in the longitudinal direction L. The setting control elements are fixed to an annular cam 32, and are made in one piece with the cam from a sheet.

Figure 3:
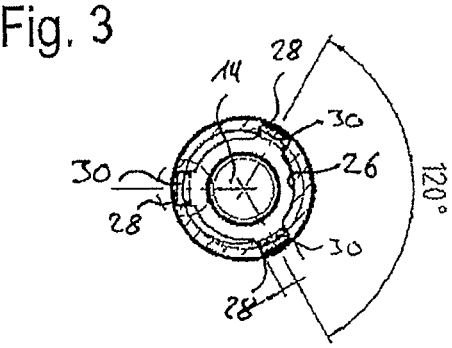
FIG. 3 is a cross sectional view through the expansion anchor from FIG. 1.

As can be seen in FIGS. 2 and 3, the setting control elements 30 project completely into the recesses 28 and do not project into the thread 26 of the receiving area 14.

The annular cam 32 is supported in a groove 34 of the expansion element 16 so that the cam 32 is fixedly coupled to the expansion element 16.

In the initial position shown in FIG. 2, the setting control elements 30, project against the longitudinal direction L of the receiving area 14 and thus are visible even with an inserted expansion anchor 10.

The expansion element 16 is screwed into the receiving area 14 and thus moved in the longitudinal direction L, the setting control element 30, because they are coupled via the cam 32 to the expansion element 16, move together with the expansion element 16 in the longitudinal direction L. Via the movement of the setting control elements 30, the position of the expansion element 16 in the receiving area 14 can be verified. The expansion effect of the expansion element 16 and the expansion of the expansion tabs 18 as function of the position of the expansion element 16 is known or can be determined beforehand. Since the setting control elements 30 allow the position of the expansion element 16 to be determined, it can thus be checked whether the expansion element 16 has reached an optimal position for expansion of the expansion tabs 18. This is particularly advantageous if the expansion element 16 is screwed so far in that an accurate check of the position of the expansion element 16 from the outside is no longer possible.

In the embodiment shown here, the setting control elements 30 are fixedly coupled via the cam 32 with the expansion element 16. This has the further advantage that on release of the expansion anchor 10, meaning the movement of the expansion element 16 opposite to the longitudinal direction L, the setting control elements 30 are also carried in this direction.

Before disassembly of the expansion anchor 10, it can also be verified whether the expansion element 16 is moved back far enough and the expansion effect on the expansion tabs 18 has been reduced so far that the expansion anchor can be removed from the hole.

This notwithstanding, it is also conceivable that the setting control elements 30 are not fixedly coupled to the expansion element 16, but are only carried by it in the longitudinal direction L, but remain in the expanded position after retraction of the expansion element 16.

Figure 6:
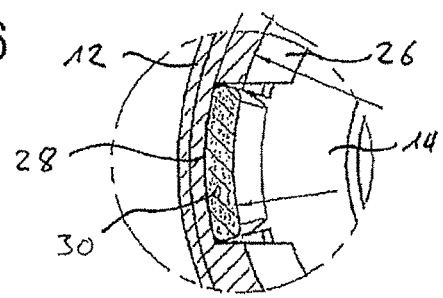

The recesses 28 in the embodiment shown here limit the receiving area 14, but do not project into the inside thread 26 (see FIG. 6). That is, the movement of the expansion element 16 is not constrained by the setting control elements 30 stored in the recesses 28.

Before the onset of the setting control elements 30, these recesses 28 may also be used to manufacture the thread 26. For this purpose a tap is used having a plurality of cutting edges sequentially arranged in the longitudinal direction L. The tap is inserted with these cutting edges into the recess 28 and rotated until complete insertion along its longitudinal axis. Each of the cutting edges, starting from the groove, cuts a full turn of the screw thread 26, until the cutting edges, following a rotation through 360°, are again in the recess 28. Then the tap 20 can, opposite to the longitudinal direction L, be retracted from the receiver area. Thus the entire length of the thread 26 is cut with a single revolution of the tap, allowing much more rapid production of the thread 26.

As, in the embodiment shown here, three evenly circumferentially distributed recesses 28 are provided, a tap with groups of three cutting edges offset by 120° can be used. The tap must be rotated only so far until the cutting edges are yet again at the next recess 28, i.e., 120° degrees.

The setting control elements 30 shown in this embodiment can be used with any type of expansion anchor 10, which uses an expansion element 16 to radially expand a portion of the expansion anchor 10, for example an impact anchor as well. A thread 26 is not absolutely necessary for the expansion element 16.

Also, the number and the distribution of the setting control elements 30 can be arbitrarily varied or adapted to the respective requirements. It is only required that the setting control element 30 is arranged so that a verification of the position of the setting control element 30 and thus checking of the position of the expansion element 16 is possible.

The control element 30 is in particular formed so that it does not project in the expanded position of the expansion element 16 from the expansion anchor 10 and the receiving area 14 is flush with the surface of the component. The setting control element may also project from the receiving area in this position, however. In this case, appropriate markings are provided on the setting control element 30, by which the position of the expansion element 16 can be checked. With such markings, for example, exact setting of the desired clamping force is possible.

The setting control elements 30 may, instead of being guided into the recesses, which have a connection to the receiving area 14, also be guided into separate channels.

The invention claimed is:

1. An expansion anchor, comprising:
    an elongated main part, wherein the elongated main part includes a receiving area extending substantially in a longitudinal direction, a plurality of expansion tabs, and a substantially axially extending recess which radially adjoins the receiving area;
    an expansion element, wherein the expansion element is movable in the receiving area in the longitudinal direction and wherein the plurality of expansion tabs are movable from an initial position to an expanded position by movement of the expansion element; and
    a setting control element, wherein the setting control element is movable in the longitudinal direction by movement of the expansion element, wherein the setting control element is movably guided in the recess, wherein a thread is provided in the receiving area, wherein the recess adjoins the thread, and wherein the setting control element does not project into the thread.

2. The expansion anchor according to claim 1, wherein the setting control element is elongated.

3. The expansion anchor according to claim 1, wherein the recess extends at least to a base of the thread and wherein the thread is divided into sections by the recess.

4. The expansion anchor according to claim 1, further comprising a plurality of setting control elements which are arranged uniformly distributed in a circumferential direction.

5. The expansion anchor according to claim 4, wherein the plurality of setting control elements are interconnected.

6. The expansion anchor according to claim 1, wherein the setting control element is fixed to a cam.

7. The expansion anchor according to claim 6, wherein the cam and the setting control element are made as a single piece.

8. The expansion anchor according to claim 1, wherein the setting control element is fixed to the expansion element.

9. The expansion anchor according to claim 1, wherein the expansion element has a tapered tip.

10. An expansion anchor, comprising:
    an elongated main part, wherein the elongated main part includes a receiving area extending substantially in a longitudinal direction, a plurality of expansion tabs, and a substantially axially extending recess which radially adjoins the receiving area;
    an expansion element, wherein the expansion element is movable in the receiving area in the longitudinal direction and wherein the plurality of expansion tabs are moveable from an initial position to an expanded position by movement of the expansion element; and
    a setting control element, wherein the setting control element is movable in the longitudinal direction by movement of the expansion element and wherein the setting control element is movably guided in the recess;
    wherein the setting control element is fixed to a cam and wherein the cam mounted on a shoulder of, or in a groove of, the expansion element.

* * * * *